US011932399B2

(12) United States Patent
Desjoyeaux et al.

(10) Patent No.: US 11,932,399 B2
(45) Date of Patent: Mar. 19, 2024

(54) EXPANDABLE CELLULAR SYSTEM FOR A SANDWICH PANEL

(71) Applicants: Safran Nacelles, Gonfreville l'Orcher (FR); SAFRAN CERAMICS, Le Haillan (FR)

(72) Inventors: Bertrand Desjoyeaux, Moissy Cramayel (FR); Davi Silva De Vasconcellos, Moissy Cramayel (FR); François Taillard, Moissy Cramayel (FR); Florent Bouillon, Moissy Cramayel (FR)

(73) Assignees: Safran Nacelles, Gonfreville l'Orcher (FR); Safran Ceramics, Le Haillan (FR)

( * ) Notice: Subject to any disclaimer, the term of this patent is extended or adjusted under 35 U.S.C. 154(b) by 411 days.

(21) Appl. No.: 17/412,676

(22) Filed: Aug. 26, 2021

(65) Prior Publication Data

US 2021/0380220 A1 Dec. 9, 2021

Related U.S. Application Data

(63) Continuation of application No. PCT/FR2020/050324, filed on Feb. 20, 2020.

(30) Foreign Application Priority Data

Feb. 26, 2019 (FR) ..................................... 19/01967

(51) Int. Cl.
*B64C 7/02* (2006.01)
*B32B 3/28* (2006.01)
(Continued)

(52) U.S. Cl.
CPC ................ *B64C 7/02* (2013.01); *B64D 29/06* (2013.01); *B64D 33/02* (2013.01); *F02C 7/045* (2013.01);
(Continued)

(58) Field of Classification Search
CPC .. B64C 7/02; B64D 29/06; B64D 2033/0206; B64D 33/02; B64D 33/06; F02C 7/045;
(Continued)

(56) References Cited

U.S. PATENT DOCUMENTS 3,903,341 A * 9/1975 Gerhold .................. B01J 35/04 428/116
4,042,738 A * 8/1977 Gulati ...................... B01J 35/04 428/116
(Continued)

FOREIGN PATENT DOCUMENTS

CN 105150610 B * 3/2018
CN 111376544 A * 7/2020 ............. B23P 15/00
(Continued)

OTHER PUBLICATIONS

International Search Report for Application PCT/FR2020/050324, dated Jul. 16, 2020.

(Continued)

*Primary Examiner* — Edgardo San Martin

(74) *Attorney, Agent, or Firm* — Burris Law, PLLC

(57) ABSTRACT

A sandwich panel for an aircraft turbojet nacelle includes an outer skin in contact with an air flow, an inner skin opposed to the outer skin, and an intermediate system comprising partitions connecting the inner and outer skins so as to form cells, the inner skin of at least one cell having at least one corrugation configured to allow the materials making up the sandwich panel to deform in the event of thermal variation.

12 Claims, 5 Drawing Sheets

F1 103 102 104 101 100 106 105 107 F3 111 F2 110 108 109

(51) Int. Cl.
*B64D 29/06* (2006.01)
*B64D 33/02* (2006.01)
*B64D 33/04* (2006.01)
*F02C 7/045* (2006.01)
*F02K 1/82* (2006.01)

(52) U.S. Cl.
CPC ...... *F02K 1/827* (2013.01); *B64D 2033/0206* (2013.01); *F05D 2260/96* (2013.01); *F05D 2300/6033* (2013.01)

(58) Field of Classification Search
CPC .. F02C 7/24; F05D 2260/96; F05D 2260/963; F02K 1/827; F02K 1/82; B32B 3/12; B32B 3/26; B32B 3/28
See application file for complete search history.

(56) References Cited

U.S. PATENT DOCUMENTS 4,161,231 A 7/1979 Wilkinson
4,323,614 A 4/1982 Gulati
4,448,828 A * 5/1984 Mochida ................ B01D 53/86 428/116
5,756,182 A * 5/1998 Landi .................... B29C 66/234 428/116
6,242,069 B1 6/2001 Hillier
7,655,195 B1 * 2/2010 Ichikawa ........... B01D 46/2482 428/116
7,842,369 B2 * 11/2010 Sugiura ............... C04B 38/0009 428/116
8,302,733 B2 * 11/2012 Peiffer .................... F02C 7/045 428/116
8,844,862 B2 * 9/2014 Journade ................ B64D 29/02 244/54
9,469,256 B2 * 10/2016 Billy ................... B60R 13/0815
9,951,690 B2 * 4/2018 Labrecque ............ F01D 17/146
10,626,799 B2 * 4/2020 Bowen .................... E04C 2/365
10,808,399 B2 * 10/2020 Alstad ................... E04B 2/7409
10,947,354 B2 * 3/2021 Loesch .................... C08J 5/244
11,142,343 B2 * 10/2021 Hubert-Choinard .... B29C 33/52
11,427,299 B2 * 8/2022 Desjoyeaux .............. B64C 1/40
2011/0108357 A1 * 5/2011 Vauchel .................. F02K 1/827 181/222
2014/0154460 A1 6/2014 Preisler et al.

FOREIGN PATENT DOCUMENTS

CN 114055859 A * 2/2022
EP 0465719 1/1992
FR 2849803 7/2004
FR 3016315 A1 * 7/2015 ............. B31D 3/023
WO WO-2018197786 A1 * 11/2018 ............. B32B 15/01

OTHER PUBLICATIONS

English Translation of International Search Report for International Application PCT/FR2020/050324, dated Jul. 16, 2020.

* cited by examiner

EXPANDABLE CELLULAR SYSTEM FOR A SANDWICH PANEL

CROSS-REFERENCE TO RELATED APPLICATIONS

This application is a continuation of International Application No. PCT/FR2020/050324, filed on Feb. 20, 2020, which claims priority to and the benefit of FR 19/01967, filed on Feb. 26, 2019. The disclosures of the above applications are incorporated herein by reference.

FIELD

The present disclosure relates to a cellular system for a sandwich panel, and more particularly to a cellular system for a sandwich panel subjected to thermal gradients or to temperature changes, such as a sandwich panel intended to equip an ejection nozzle of a nacelle of an aircraft turbojet engine.

BACKGROUND

The statements in this section merely provide background information related to the present disclosure and may not constitute prior art.

A sandwich panel comprises, in a known manner, two parallel skins (or two substantially parallel skins), connected by an intermediate system comprising partitions transverse to the skins. These transverse partitions form, together with the skins connected thereby, a cellular system.

In one variant, the skins of the sandwich panel are solid. This is then referred to as a structural panel.

Such a structural panel has a stiffening function.

In another variant, one skin of the sandwich panel is perforated, i.e. acoustically permeable, and the other skin is an acoustic reflector that could be perforated or not. This is then referred to as an acoustic panel.

Such an acoustic panel allows for an acoustic attenuation.

An ejection nozzle is disposed in a known manner at the rear of an aircraft turbojet engine, more specifically downstream of the turbine of the turbojet engine concentrically with a shroud, which is, in turn, fastened on the downstream edge of the combustion chamber of the turbojet engine.

The terms “upstream” and “downstream” should be understood with respect to the flow direction of the exhaust gases of the turbojet engine.

In general, a nozzle includes at least one peripheral sandwich panel, having one skin in contact with the hot air flow at the outlet of the turbojet engine, called outer skin, and an opposite skin, called inner skin.

Such a sandwich panel disposed at the periphery of an ejection nozzle is subjected to high temperatures on the outer skin side in contact with the hot air flow. There is a thermal gradient between the inner skin and the outer skin of the sandwich panel. This temperature gradient may reach 200 and possibly 300° C. between the two skins.

This thermal gradient between the skins causes mechanical stresses at the level of the materials forming the sandwich panel. These stresses may also be due to the variable thermal expansion coefficients of the constituent materials of the panel. Such mechanical stresses may cause the break-up of the sandwich panel if these are higher than the strength of the materials.

It is desired to reduce these mechanical stresses, so as to be able to use materials whose strength is lower and which have the advantage of being lighter, such as ceramics.

A known solution consists in separating each partition of the intermediate system into two portions, in a plane parallel to the inner and outer skins, so that each partition has a first portion connected to the inner skin and a second portion connected to the outer skin, the first and second portions being connected to one another by a connecting rod system. This connecting rod system allows reducing mechanical stresses but it has the drawback of increasing the mass of the sandwich panel. Furthermore, each partition being separated into two portions, in a plane parallel to the inner and outer skins, they do not form with the inner and outer skins, a cellular system. Hence, such a panel cannot be used as an acoustic panel.

Another known solution for acoustic panels consists in making intermediate structure cells open at the level of the outer skin, so that said cells are partially closed. Hence, the outer skin is closed by several skin elements. The drawback of this solution is that these openings cause considerable air leakages, which reduces the acoustic attenuation efficiency.

SUMMARY

This section provides a general summary of the disclosure and is not a comprehensive disclosure of its full scope or all of its features.

The present disclosure addresses the above-referenced concerns and provides reduced mechanical stresses caused by thermal gradients.

The present disclosure relates to a sandwich panel for a nacelle of an aircraft turbojet engine, including:

- an outer skin, in contact with an air flow,
- an inner skin, opposite to the outer skin, and
- an intermediate system comprising partitions linking the inner and outer skins, so as to form cells,
- wherein the inner skin of at least one cell has at least one undulation configured to enable the constituent materials of the sandwich panel to be deformed in case of thermal variation.

Such an undulation enables the constituent materials of the sandwich panels to deform in case of thermal variation, and thus avoids mechanical stresses.

By undulation, it should be understood a non-planar surface, the undulation may comprise one or several curvature(s) and/or one or several shearing(s).

By shearing, it should be understood an angular undulation, having steps, also called broken line. Thus, the wavy inner skin may be in the form of a surface with facets connected by edges.

In this manner, the constituent materials of the sandwich panel could deform in case of thermal variation and mechanical stresses are reduced.

The sandwich panel of the present disclosure may include one or more of the following optional features, which may be considered separately or in any possible combination.

According to one form, the inner skin has at least one undulation in at least two directions.

According to another form, the inner skin has at least one undulation transverse to the hot air flow.

According to yet another form, the inner skin of said at least one cell has a broken line and/or a curve at the level of its intersection with at least one plane transverse to the outer skin.

According to a further form, the inner skin of said at least one cell has a broken line and/or a curve at the level of its intersection with at least two planes transverse to the outer skin, said planes being secant and, in one variation, perpendicular.

According to still a further form, the inner skin of said at least one cell has a broken line and/or a curve at the level of its intersection with any plane transverse to the outer skin.

According to another form, at least one partition of said at least one cell has at least one wavy area.

By wavy area, it should be understood a non-planar surface having at least one undulation, the undulation may comprise a curvature and/or a shearing.

By shearing, it should be understood an angular undulation, having at least one step, also called broken line. Thus, the wavy inner skin may be in the form of a surface with facets connected by edges.

According to still another form, all partitions have at least one wavy area.

In one variation of this form, the at least one wavy area of the partition is disposed in contact with the inner skin.

The at least one wavy area of the partition is disposed over at least one portion of the height of the partition.

The at least one wavy area of the partition has an undulation according to a vertical and/or horizontal direction, and in one form according to a vertical and horizontal direction.

According to a further form, the outer skin is perforated and the inner skin is an acoustic reflector, so that the sandwich panel provides acoustic attenuation.

According to this form, the sandwich panel is an acoustic panel.

According to this form, the inner skin is either solid or perforated.

According to yet another form, the constituent materials of the sandwich panel are metals and/or composite materials such as organic matrix composites (OMCs) or ceramic matrix composites (CMCs).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
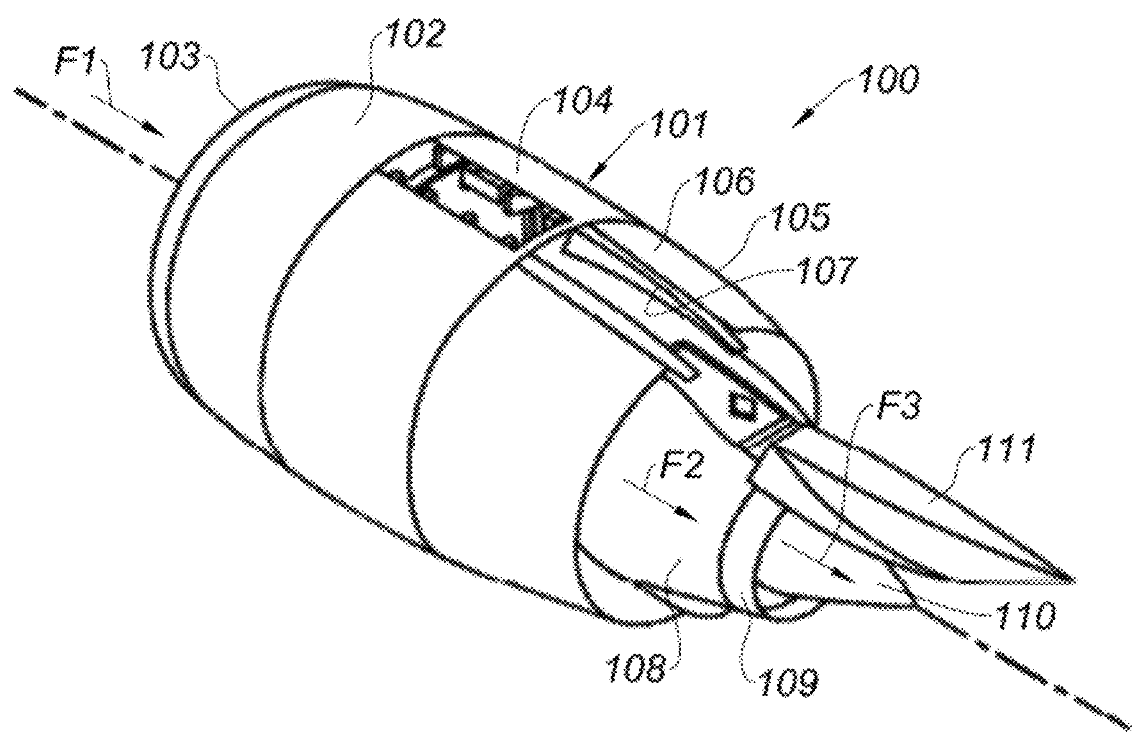
FIG. 1 is a schematic view of a nacelle of an aircraft turbojet engine comprising a sandwich panel according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description and in the claims, identical, similar or analogous components will be referred to by the same reference numerals and the terms "upstream," "downstream," "inner," "outer," "horizontal," "vertical," etc. will be used without limitation with reference to the drawings in order facilitate the description.

FIG. 1 illustrates a nacelle 100 hanging from a pylon 111 configured to be fastened to a wing (not shown) of an aircraft (not shown). The nacelle 100 comprises an outer structure 101 comprising an upstream section 102 provided with a lip 103 forming an air inlet F1, a middle section 104 receiving a fan (not shown) of a turbojet engine (not shown), and a downstream section 105.

The outer structure 101 defines an outer aerodynamic surface 106 and an inner aerodynamic surface 107, connected upstream by a leading edge wall forming an air inlet lip 103.

The nacelle 100 further comprises an inner fixed structure 108 concentric with the downstream section 105 of the outer structure 101, said inner fixed structure 108 surrounding an upstream portion of the turbojet engine (not shown).

The inner fixed structure 108 and the outer structure 101 delimit an annular flow path defining a passage for a secondary cold air flow F2.

The nacelle 100 also comprises an ejection nozzle 109, also called ejection conduit, and a gas ejection plug 110. The ejection plug 110 and the ejection nozzle 109 define a passage for a hot air flow F3 coming out of the turbojet engine.

The nacelle 100 comprises sandwich panels 10 (FIG. 2) allowing stiffening and/or acoustic attenuation.

These sandwich panels 10 are subjected to thermal gradients, in particular at the level of the downstream section 105 of the outer structure 101, of the inner fixed section 108, and of the ejection nozzle 109, because of their proximity with the turbojet engine, and their contact with cold F1 and hot F2 air flows.

Figure 2:
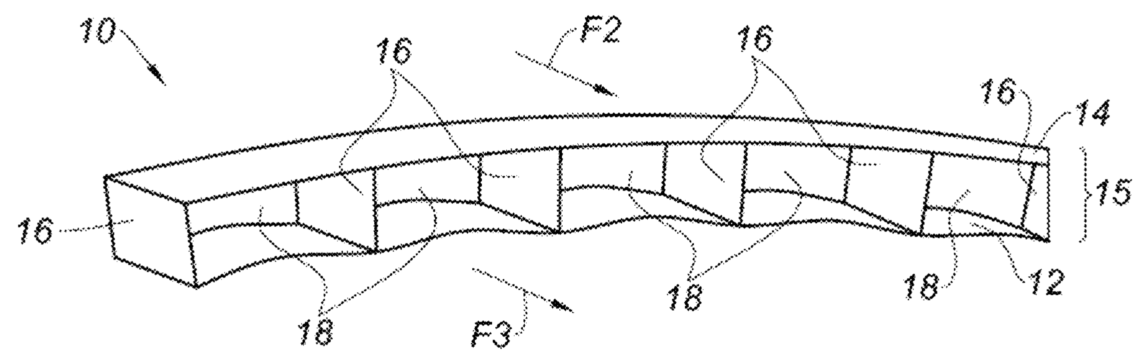
FIG. 2 is a partial schematic view of a sandwich panel according to a first variation of the present disclosure.

FIG. 2 illustrates a sandwich panel 10 for a nacelle 100 (FIG. 1) according to a first variation of the present disclosure.

The sandwich panel 10 comprises an inner skin 12 and an outer skin 14 connected by an intermediate system 15 comprising partitions 16 disposed in planes perpendicular to the outer skin 14.

The inner 12 and outer 14 skins are parallel (or substantially parallel).

In this variation, the sandwich panel 10 is disposed on the ejection nozzle 109. Thus, the outer skin 14 is in contact with the cold air flow F2 coming out of the annular flow path, and the inner skin 12 is in contact with the hot air flow F3 coming out of the turbojet engine.

The inner skin 12 is opposite to the outer skin 14.

The partitions 16 form, together with the inner 12 and outer 14 skins, cells 18 with a parallelepipedic shape (or substantially parallelepipedic shape).

In FIG. 2, only two partitions 16 of each cell 18 are shown. Other partitions (not shown) transverse to the inner and outer skins allow closing these cells 18.

The outer skin 14 of each cell 18 is planar (or substantially planar).

The inner skin 12 of each cell 18 has an undulation comprising at least one curvature transverse to the hot air flow F3.

In a variant not shown, the sandwich panel 10 is disposed over the downstream section 105 of the outer structure 101. Thus, the outer skin 14 is in contact with an outer air flow (not shown), and the inner skin 12 is in contact with the cold air flow F2 coming out of the annular flow path.

Figure 3:
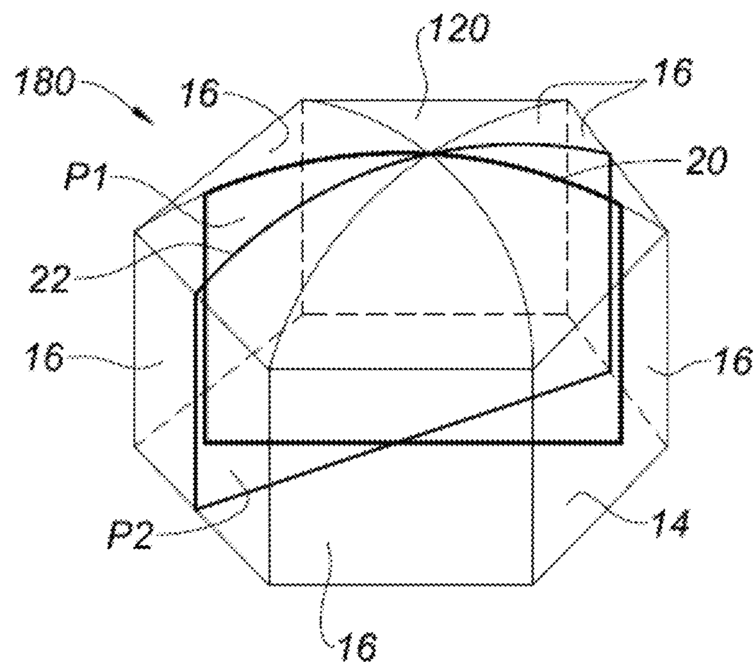
FIG. 3 is a perspective schematic view of a cell of a sandwich panel according to a second variation of the present disclosure.

FIG. 3 illustrates a cell 180 of a sandwich panel according to a second variation of the present disclosure. The cell 180 comprises an outer skin 14 and an inner skin 120, the inner and outer skins being separated by six partitions 16. The cell 180 has a hexagonal shape.

The outer skin 14 of each cell is planar (or substantially planar).

The inner skin 120 of each cell 180 has an undulation comprising at least one curvature disposed transverse to the hot F3 or cold F2 air flow, depending on the arrangement of the sandwich panel 10 constituted by cells 180.

The inner skin 120 has a first curved line 20 at the level of its intersection with a first plane P1 transverse to the outer skin 14.

In one form, the first plane P1 is intended to be transverse to the hot F3 or cold F2 air flow.

The inner skin 120 further has a second curved line 22 at the level of its intersection with a second plane P2 transverse to the outer skin 14, the second plane P2 being secant to the first plane P1.

The first and second curved lines 20, 22 have one single direction of curvature, the curvatures may be different from each other.

In another variant not shown, the first and second planes P1, P2 are perpendicular.

More particularly, the inner skin 120 has a curved line 20, 22 at the level of its intersection with any plane transverse to the outer skin 14.

Figure 4:
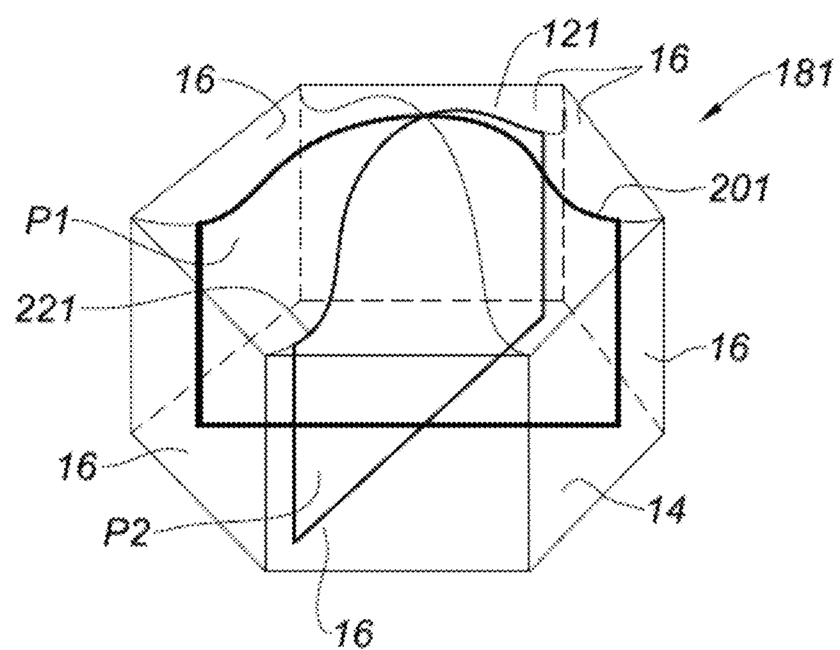
FIG. 4 is a perspective schematic view of a cell of a sandwich panel according to a third variation of the present disclosure.

FIG. 4 illustrates a cell 181 of a sandwich panel according to a third variation of the present disclosure. The cell 181 comprises an outer skin 14 and an inner skin 121, the inner and outer skins being separated by six partitions 16. The cell 181 has a hexagonal shape.

The outer skin 14 of each cell is planar (or substantially planar).

The inner skin 121 of each cell 181 has an undulation comprising at least one curvature disposed transverse to the hot F3 or cold F2 air flow, according to the arrangement of the sandwich panel 10 constituted by cells 181.

The inner skin 121 has a first curved line 201 at the level of its intersection with a first plane P1 transverse to the outer skin 14.

In one form, the first plane P1 is transverse to the hot F3 or cold F2 air flow.

The inner skin 121 further has a second curved line 221 at the level of its intersection with a second plane P2 transverse to the outer skin 14, the second plane P2 being secant to the first plane P1.

Each of the first and second curved lines 201, 221 has several curvatures.

In a further variant not shown, the first and second planes P1, P2 are perpendicular.

More particularly, the inner skin 121 has a curved line 201, 221 at the level of its intersection with any plane transverse to the outer skin 14.

Figure 5:
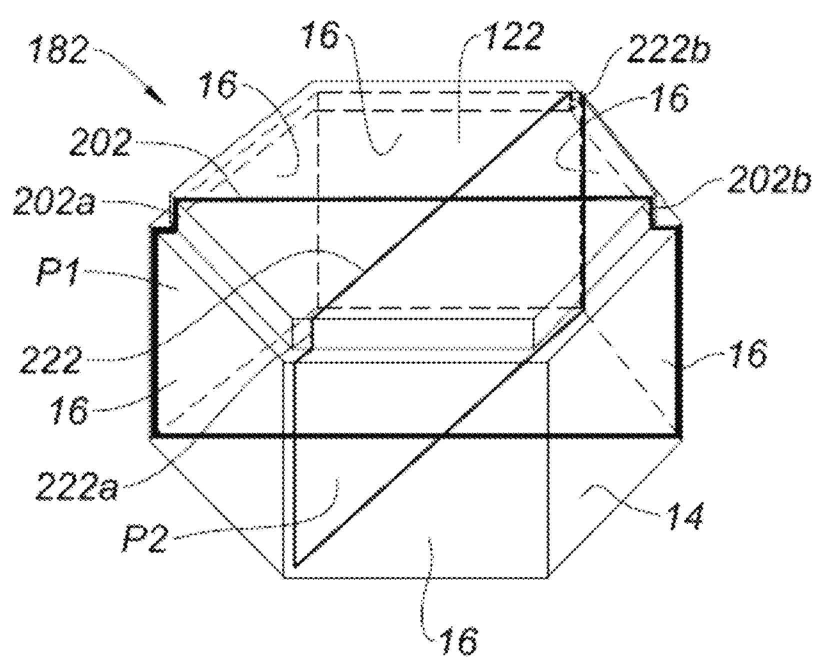
FIG. 5 is a perspective schematic view of a cell of a sandwich panel according to a fourth variation of the present disclosure.

FIG. 5 illustrates a cell 182 of a sandwich panel according to a fourth variation of the present disclosure. The cell 182 comprises an outer skin 14 and an inner skin 122, the inner and outer skins being separated by six partitions 16. The cell 182 has a hexagonal shape.

The outer skin 14 of each cell is planar (or substantially planar).

The inner skin 122 of each cell 182 has an undulation comprising at least one shearing disposed transverse to the hot F3 or cold F2 air flow, depending on the arrangement of the sandwich panel 10 constituted by cells 182.

The inner skin 122 has a first broken line 202 at the level of its intersection with a first plane P1 transverse to the outer skin 14.

In one form, the first plane P1 is transverse to the hot F3 or cold F2 air flow.

The inner skin 122 further has a second broken line 222 at the level of its intersection with a second plane P2 transverse to the outer skin 14, the second plane P2 being secant to the first plane P1.

In this variation, the undulation is a shearing.

The first and second broken lines 202, 222 have several steps, respectively 202*a*, 202*b*, and 222*a*, 222*b*.

In another variant not shown, the first and second planes P1, P2 are perpendicular.

More particularly, the inner skin 122 has a broken line 202, 222 at the level of its intersection with any plane transverse to the outer skin 14.

In a further variant not shown, the inner skin of a cell includes an undulation including at least one curvature and at least one shearing.

Figure 6:
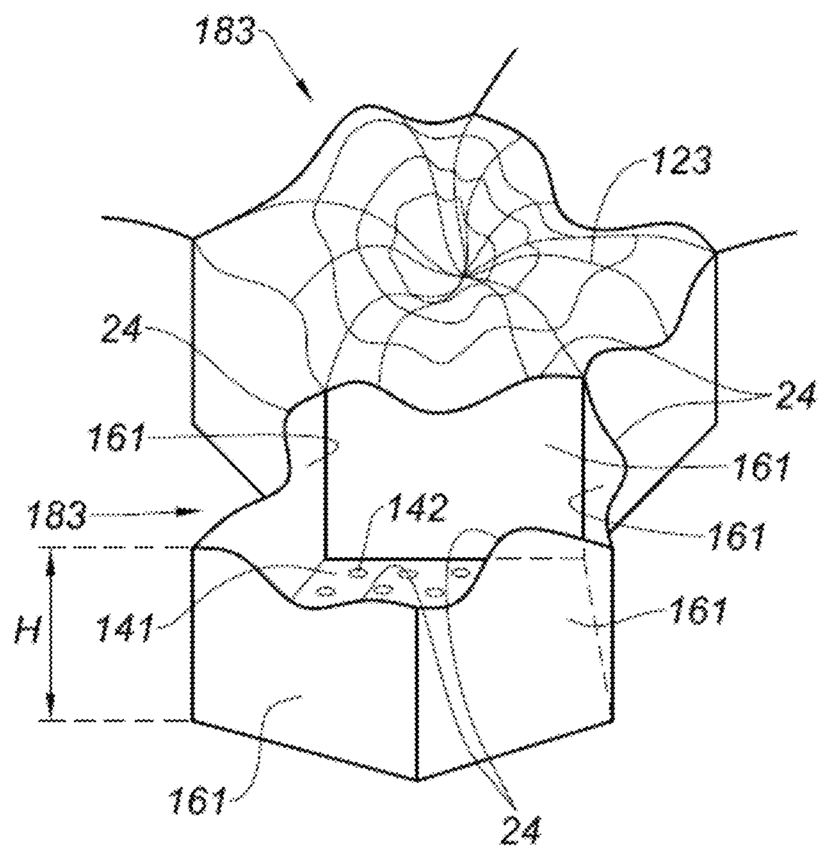
FIG. 6 is a perspective schematic view of a cell of a sandwich panel according to a fifth variation of the present disclosure.

FIG. 6 illustrates two cells 183 of a sandwich panel according to a fifth variation of the present disclosure. The cells 183 comprise a perforated outer skin 141, having perforations 142, and an inner skin 123 in the form of an acoustic reflector, the inner and outer skins being separated by five partitions 161. The cell 183 has a pentagonal shape.

A sandwich panel including such cells 183 is an acoustic panel.

The outer skin 141 of each cell is planar (or substantially planar).

The inner skin 123 of each cell 183 has an undulation comprising at least one curvature disposed transverse to the hot F3 or cold F2 air flow, according to the arrangement of the sandwich panel 10 constituted by cells 183, identical (or substantially identical) to the curvatures described above with reference to FIG. 4.

Each partition 161 has at least one wavy area 24 disposed over at least one portion of the height H of the partition 161. In the example of FIG. 6, the partitions 161 have a rectilinear contact line along the contact with the outer skin 141, and a wavy contact line along the contact with the inner skin 123.

The wavy area 24 is a non-planar surface which may have several curvatures according to horizontal and vertical directions.

Figure 7A:
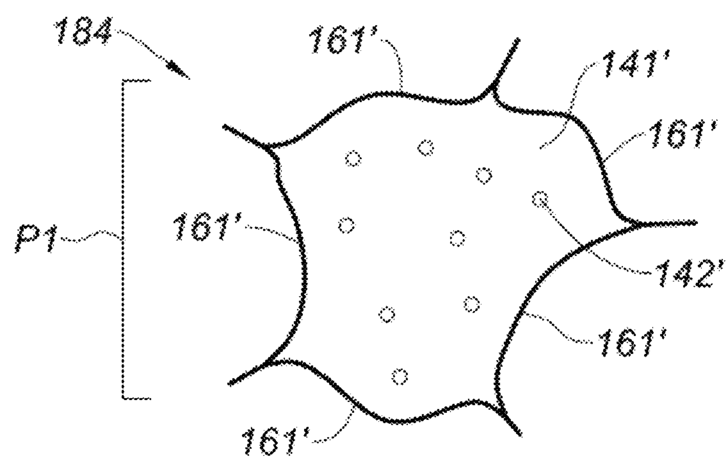
FIG. 7A is a sectional schematic view of a cell of a sandwich panel according to a sixth variation of the present disclosure, according to a first plane parallel to the outer skin of said cell.
Figure 7B:
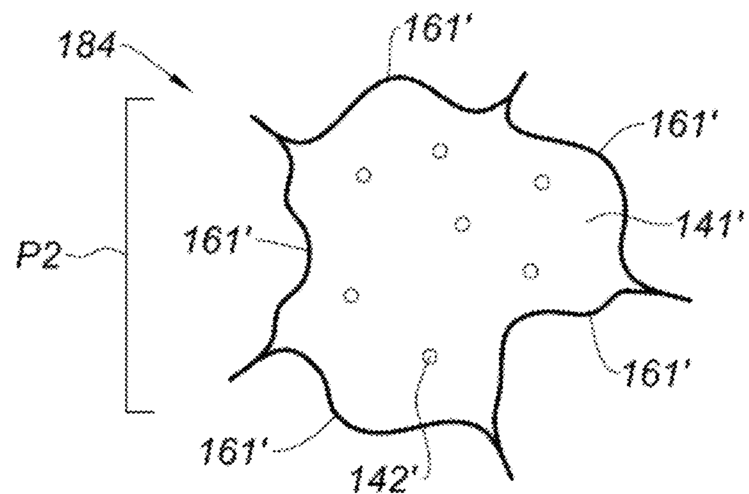
FIG. 7B is a sectional schematic view of the cell of FIG. 7A, according to a second plane parallel to the outer skin of said cell.

FIGS. 7A and 7B illustrate two sections of a cell 184 according to a sixth variation of the present disclosure, according to planes, respectively P1 and P2, parallel to the outer skin 141' having perforations 142'. The cell 184 has wavy partitions 161' according to a horizontal direction, that is to say according to a direction parallel to the outer skin 141' or to the sectional plane P1, P2.

The undulations of the partitions 161' are different in the first plane P1 and in the second plane P2.

Figure 8:
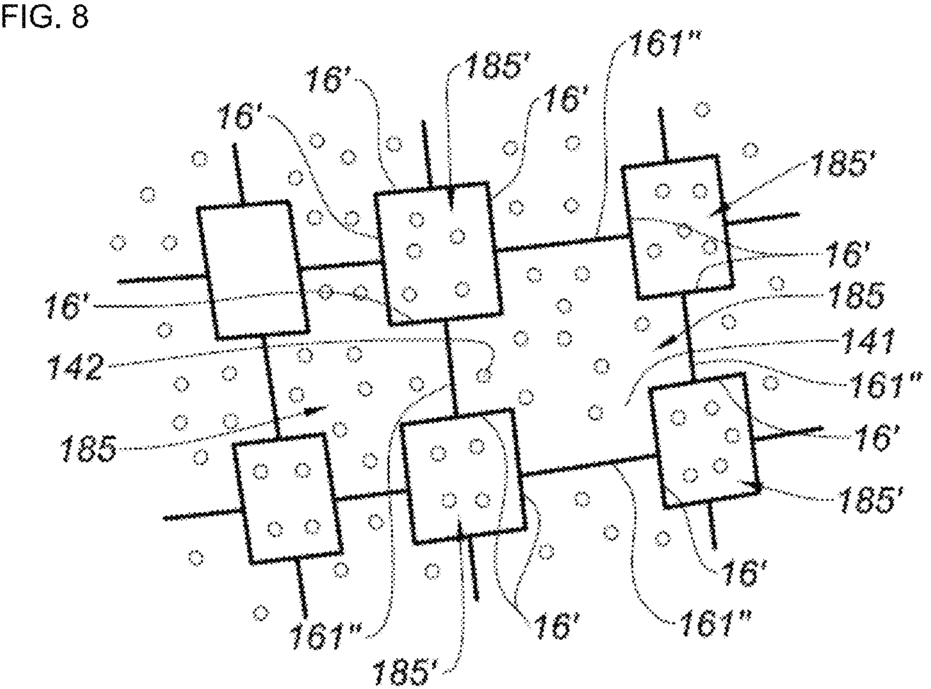
FIG. 8 is a sectional schematic view of cells of a sandwich panel according to a seventh variation of the present disclosure.

FIG. 8 illustrates a variant of the present disclosure wherein cells 185 have partitions 161" having a wavy area in the form of a shearing.

In this variant, adjacent cells 185' have straight partitions 16' which form an intersection with the sheared partitions 161". Therefore, when the dimensions of the straight partitions 16' increase or decrease by the effect of the temperature differences, the sheared partitions 161' easily deform in bending thereby avoiding high mechanical stresses.

In this variant, the inner skin (not shown) also has undulations to deform at the same time as the sheared partitions 161'. The wavy inner skin is shown in FIGS. 3 to 6.

In additional variants not shown, the cells comprise between two and eight partitions, and in one form four partitions.

Furthermore, in variants not shown, a sandwich panel according to the present disclosure includes cells according to different variants.

In some forms, the constituent materials of the sandwich panels according to the present disclosure are metals.

Alternatively, in some forms the constituent materials of the sandwich panels according to the present disclosure are composite materials such as organic matrix composites (OMCs) or ceramic matrix composites (CMCs).

In other variants, the inner and outer skins of the sandwich panels according to the present disclosure are made of a composite material such as a ceramic matrix composite (CMC), and the partitions are metallic (for example made of Inconel or Titanium).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A sandwich panel for a nacelle of an aircraft turbojet engine, the sandwich panel comprising:
- an outer skin in contact with an air flow;
- an inner skin opposite to the outer skin; and
- an intermediate system comprising partitions linking the inner skin and the outer skin, so as to form cells,
- wherein the inner skin of at least one cell has at least one undulation configured to enable constituent materials of the sandwich panel to be deformed in case of thermal variation, and at least one partition of said at least one cell has at least one wavy area.

2. The sandwich panel according to claim 1, wherein the inner skin of the at least one cell has a broken line and/or a curve at an intersection of the inner skin with at least one plane transverse to the outer skin.

3. The sandwich panel according to claim 1, wherein the inner skin of the at least one cell has a broken line and/or a curve at an intersection of the inner skin with at least two planes transverse to the outer skin, the at least two planes being secant.

4. The sandwich panel according to claim 1, wherein the inner skin of the at least one cell has a broken line and/or a curve at an intersection of the inner skin with at least two planes transverse to the outer skin, the at least two planes being perpendicular.

5. The sandwich panel according to claim 1, wherein the inner skin of the at least one cell has a broken line and/or a curve at an intersection of the inner skin with any plane transverse to the outer skin.

6. The sandwich panel according to claim 1, wherein all the partitions of the at least one cell have at least one wavy area.

7. The sandwich panel according to claim 6, wherein the at least one wavy area is in contact with the inner skin.

8. The sandwich panel according to claim 6, wherein the at least one wavy area has an undulation according to a vertical and/or horizontal direction.

9. The sandwich panel according to claim 1, wherein the outer skin is perforated and the inner skin is an acoustic reflector, so that the sandwich panel provides acoustic attenuation.

10. The sandwich panel according to claim 1, wherein the constituent materials of the sandwich panel are metals and/or composite materials.

11. The sandwich panel according to claim 10, wherein the constituent materials of the sandwich panel are organic matrix composites (OMCs) or ceramic matrix composites (CMCs).

12. An ejection nozzle of a nacelle of an aircraft turbojet engine comprising a sandwich panel according to claim 1.

* * * * *